United States Patent [19]
Launay

[11]  4,430,053
[45]  Feb. 7, 1984

[54] APPARATUS FOR SEALING TARTS OR PIES
[75] Inventor: Noël Launay, Beauvais, France
[73] Assignee: Societe d'Assistance Technique pour Produits Nestle S.A., Lausanne, Switzerland
[21] Appl. No.: 414,486
[22] Filed: Sep. 2, 1982
[30] Foreign Application Priority Data Sep. 8, 1981 [FR] France .................. 81 17012

[51] Int. Cl.³ .................. B29C 17/08; A21C 11/10
[52] U.S. Cl. .................. 425/510; 425/292; 425/306; 425/311
[58] Field of Search .................. 425/510, 512, 518, 520, 425/235, 292, 297, 306, 311; 99/450.1; 83/554 X, 564 X

[56] References Cited
U.S. PATENT DOCUMENTS

| 740,346 | 9/1903 | Williams | 425/292 |
| 744,638 | 11/1903 | Spring | 425/292 |
| 898,478 | 9/1908 | Jackson | 425/311 |
| 1,548,659 | 8/1925 | Christianson | 425/292 |

FOREIGN PATENT DOCUMENTS 210649  2/1924  United Kingdom ............... 425/510

Primary Examiner—Willard E. Hoag
Attorney, Agent, or Firm—Vogt & O'Donnell

[57] ABSTRACT

An apparatus for sealing tarts or pies, particularly almond tarts, comprises a plate intended to receive the product to be subjected to the confection process, a suitably shaped mould arranged above said plate and fixed to a shaft capable of making an ascending-descending movement with a means for applying pressure to said product and a means associated with said mould and consisting of lateral arms carrying at their ends means for nipping and cutting into the periphery of the product to be obtained, said arms being activated in such a way that said nipping and cutting means are applied to said product when the mould is in its lower position.

The apparatus enables a sequence of operations hitherto carried out manually with several different tools to be performed simply, economically and automatically.

5 Claims, 2 Drawing Figures

APPARATUS FOR SEALING TARTS OR PIES

This invention relates to an apparatus for sealing tarts or pies.

The confection of tarts of the kind in question, particularly almond tarts, involves spreading a first layer of pastry called the undercrust over a flat surface, applying to the undercrust the "filling" or mix with which the finished tart will be filled, spreading a second layer of pastry called the uppercrust over the whole, applying a pressure to cause the undercrust and uppercrust to adhere to one another around the filling and then forming the side edges of the two crusts by alternate nipping and cutting.

On the artisanal or semi-industrial scale, this confection process is generally carried out by hand using a suitably shaped tool which is applied to the combination of the two crusts surrounding the central mix or filling, applying the correct pressure to join the two crusts and then using a knife to make the lateral and peripheral cuts in the crusts thus joined.

Now, the present invention seeks to provide an apparatus which enables all these operations to be carried out simply, economically and automatically and which thus constitutes an industrial means for the confection of sweet or savoury "filled" tarts, particularly almond tarts or pies.

Thus, the apparatus according to the invention is essentially characterised by the fact that it comprises a plate intended to receive the product to be prepared, a mould of suitable shape arranged above said plate and fixed to a shaft capable of making an ascending-descending movement with a means for applying pressure to said product and a means associated with said mould and comprising lateral arms supporting at their ends means for nipping and cutting into the periphery of the product to be obtained, said arms being activated to apply said nipping and cutting means to said product when said mould is in its lower position.

According to other features of the apparatus according to the invention:

Said arms equipped with said nipping and cutting means are pivotally mounted between two supporting plates which themselves follow the ascending-descending movements of said mould.

The ascending-descending movement of said mould and that of said supporting plates are imparted by means of a ram.

At least one of said supporting plates is also designed to slide along the shaft to which the mould is fixed.

The pressure applied to the product to be obtained and the return movement of the moving parts of the apparatus are generated by return springs.

Other features and advantages of the invention will become more clearly apparent from the following description in conjunction with the accompanying drawings which show by way of example one embodiment of the apparatus according to the invention and in which.

Figures 1, 2:
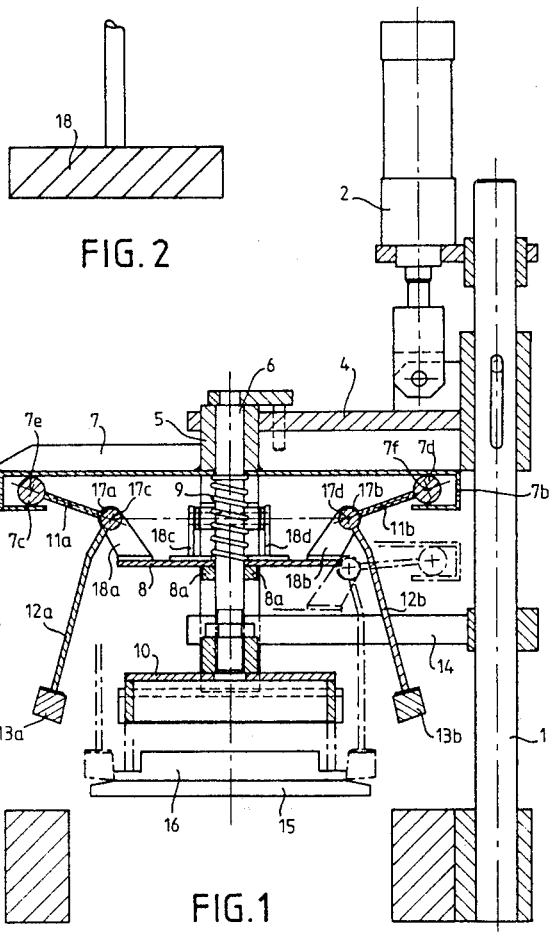
FIG. 1 is an elevation of and a section through an apparatus according to the invention.
FIG. 2 is an elevation diagrammatically illustrating one of the nipping and cutting means of the apparatus according to the invention.

Referring to the drawings, it can be seen that the apparatus consists essentially of a frame of which one of the members 1, preferably in the form of a column, has been shown and on which the various constituent parts and motors are mounted. Thus, a ram 2 fixed to said frame is intended to act on an assembly 3 which is itself made up in the following manner: an arm 4 carries at its ends a tubular element 5 inside which is mounted a shaft 6. Associated with this tubular element 5 are two brackets or plates 7 and 8 which will be described in more detail hereinafter and which are separated from one another by an adjustable distance.

A spring 9 is provided between these two brackets. The function of this spring will become apparent from the following description.

In addition, the end of the cylindrical tubular element 5 is equipped with a mould 10.

In the vicinity of and below its periphery, the plate 7 fixed to the tubular element 5 comprises angle members, such as 7a-7b, in each of which is accommodated a circular, cylindrical or spherical block (7c-7d) mounted to pivot about its axis (7e-7f). Each block carries an arm 11a-11b which is itself connected to a corresponding element 17a-17b mounted to pivot about an axis 17c-17d supported by a yoke 18a-18b mounted on the plate 8. Each of the elements 17a-17b in turn carries an arm (12a-12b) preferably arranged substantially orthogonally in relation to the corresponding arm (11a-11b) at the end of which is mounted a blade holder (13a-13b). A second pair of arms mounted in the same way as the first pair is provided orthogonally in relation thereto. Moreover, this second pair of arms is shown in FIG. 1 joined by the yokes 18c-18d coresponding to the yokes 18a-18b.

The movement of these blade-holding arms will become apparent from the following description.

The plate 8 is applied by the spring 9 to a collar 8a designed to slide in the tubular element 5 and along the shaft 6.

The frame 1 also comprises a member 14 which is vertically adjustable and which will be referred to hereinafter as a "stop".

Finally, the apparatus comprises a plate 15 for supporting the product shown diagrammatically at 16.

The apparatus described in the foregoing operates as follows:

When the rod of the ram 2 acts by any suitable means on the arm 4, the arm 4 is moved downwards, taking with it the tubular element 5 which in turn entrains the two brackets 7 and 8 of the mould 10. If the precaution of placing an undercrust carrying a filling and an uppercrust covering said filling on the plate 15 has been taken beforehand, the effect of the downward movement of said mould 10 is to apply an annular portion of the uppercrust to the undercrust and to impart to the whole, over the central part of the product, the shape corresponding to the internal shape of said mould. In the particular case illustrated in the drawing, this shape is a parallelepipedic shape, thus explaining the final shape which the article of patisserie obtained will assume.

Since the travel of the ram is limited to a certain distance greater than the distance separating the bracket or plate 8 from the stop 14, the tubular element continuing its travel, said bracket bears against said stop and slides along the central shaft 6, compressing the spring 9.

During this relative displacement of the bracket 8, the mould 10 which continues its downward movement still applies a pressure to the uppercrust, pressing it onto the undercrust so that the central part of the whole is completely surrounded.

At the same time, the return of the bracket 8 towards the bracket 7 has resulted in the entrainment of the pivotal assembly 11, 12 which, through the relative displacement of the pivot pins 17, produces a lateral deflection of the arms 12 and hence of the blade holders 13 which thus surround the periphery of the two joined crusts. The presence of the blades 18 contributes to the nipping and cutting of said periphery. The blades may be inclined at any angle although they are preferably inclined at an angle of the order of 45°.

When the mould ascends under the action of the rod of the ram 2, the reverse movements facilitated by the return forces of the spring 9 take place and a fresh cycle may be started for a new product.

The embodiment of the apparatus described in the foregoing comprises a single control system for the various nipping blades. In a variant, the movements of the nipping blades may also be independently controlled by pneumatic rams or by any other control system.

It is obvious that the present invention has been described purely by way of explanation without any intended limitation and that any useful modifications may be made to the invention without exceeding its scope.

I claim:

1. An apparatus for sealing tarts or pies, particularly almond tarts, essentially characterised in that it comprises a plate intended to receive the product to be subjected to the confection process, a mould of suitable shape situated above said plate and fixed to a shaft capable of making an ascending-descending movement with a means for applying pressure to said product and
    a means associated with said mould consisting of lateral arms supporting at their ends means for nipping and cutting into the periphery of the product to be obtained, said arms being activated in such a way that said nipping and cutting means are applied to said product when the mould is in its lower position.

2. An apparatus as claimed in claim 1, wherein the pressure applied to the product to be obtained and the return movement of the moving parts are generated by return springs.

3. An apparatus as claimed in claim 1, wherein the said arms equipped with said nipping and cutting means are pivotally mounted between two supporting plates which themselves follow the ascending-descending movements of said mould.

4. An apparatus as claimed in claim 1 or claim 3 wherein the ascending-descending movement of said mould and that of said supporting plates are generated by means of a ram.

5. An apparatus as claimed in claim 3, wherein at least one of said supporting plates is also designed to slide along the shaft to which the mould is fixed.

* * * * *